United States Patent
Sato

(10) Patent No.: US 8,631,214 B2
(45) Date of Patent: Jan. 14, 2014

(54) MEMORY CONTROL CIRCUIT, CONTROL METHOD THEREFOR, AND IMAGE PROCESSING APPARATUS

(75) Inventor: Hiroki Sato, Tokyo (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 250 days.

(21) Appl. No.: 13/287,865

(22) Filed: Nov. 2, 2011

(65) Prior Publication Data

US 2012/0105914 A1    May 3, 2012

Related U.S. Application Data

(60) Provisional application No. 61/409,935, filed on Nov. 3, 2010.

(51) Int. Cl.
*G06F 12/00* (2006.01)

(52) U.S. Cl.
USPC ............ 711/154; 711/167; 711/170; 711/171

(58) Field of Classification Search
None
See application file for complete search history.

(56) References Cited

U.S. PATENT DOCUMENTS

2008/0024163 A1    1/2008    Marui

FOREIGN PATENT DOCUMENTS

JP    04-062647    2/1992
JP    2007-241619    9/2007

*Primary Examiner* — Shawn X Gu
(74) *Attorney, Agent, or Firm* — Patterson & Sheridan, LLP

(57) ABSTRACT

In one embodiment, a circuit includes an input buffer, an output buffer, a counter, an issuing unit, a first controller, a register, and a second controller. The input buffer and the output buffer have a variable storage capacity. The counter cyclically counts from a first value to a second value. The issuing unit issues a write command if a count value of the counter is a third value and issues a read command if the count value is a fourth value. The register stores a first setting value, a second setting value and a third setting value to be capable of changing each of the setting values. The second controller controls the components to set the storage capacity, the second value, and one of the third and fourth values respectively to values corresponding to the first to third setting values.

19 Claims, 9 Drawing Sheets

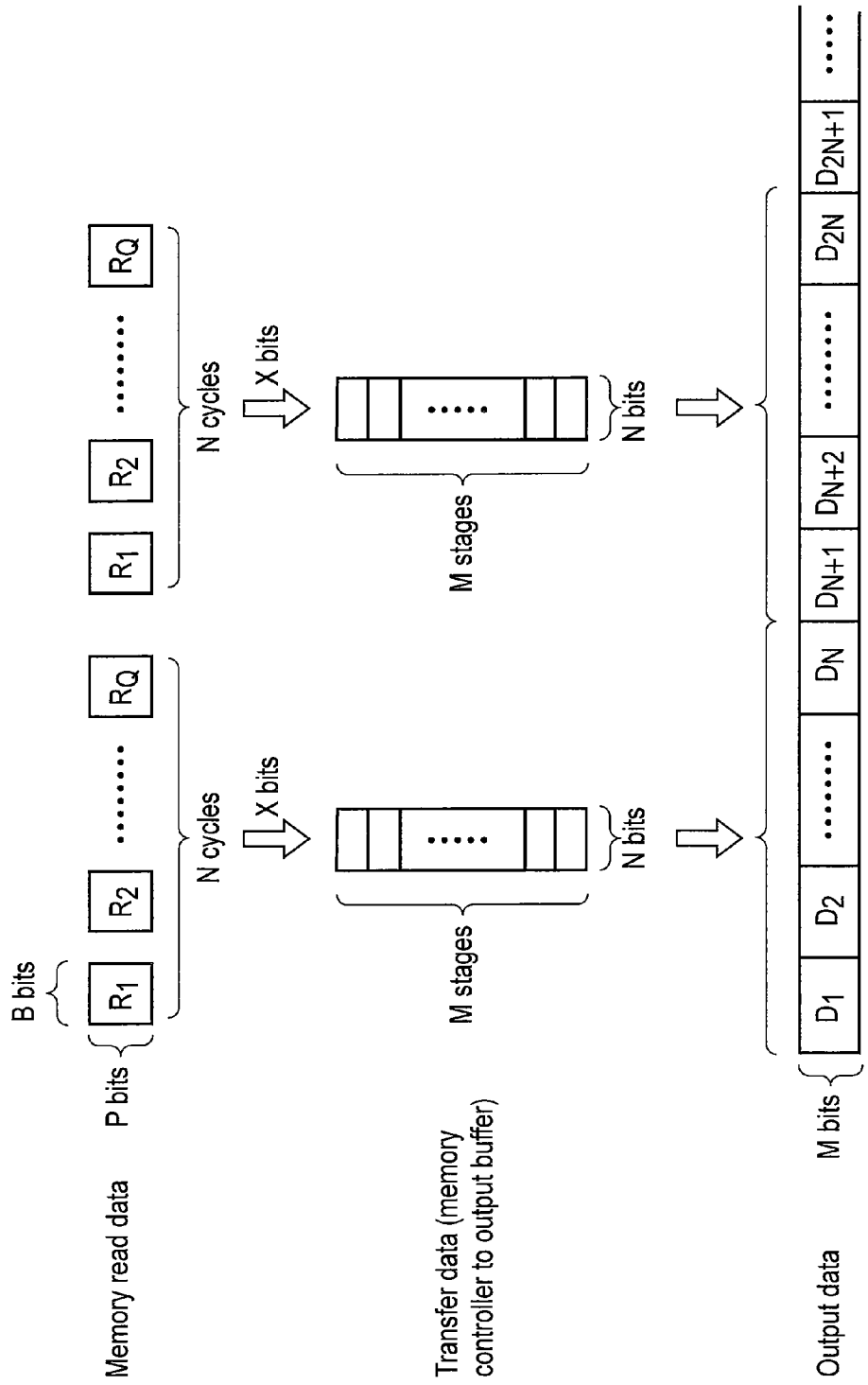
F I G. 3

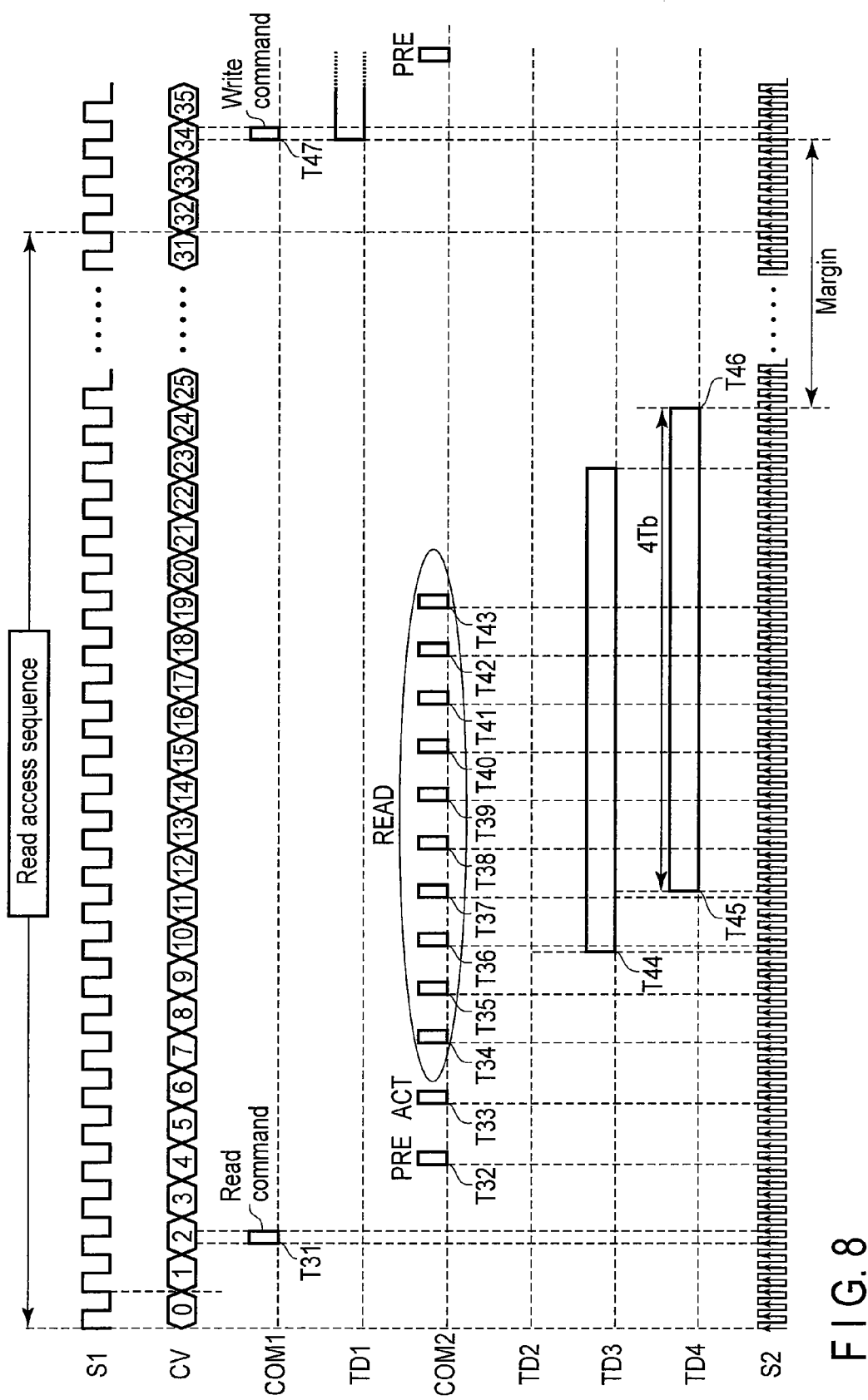
F I G. 8

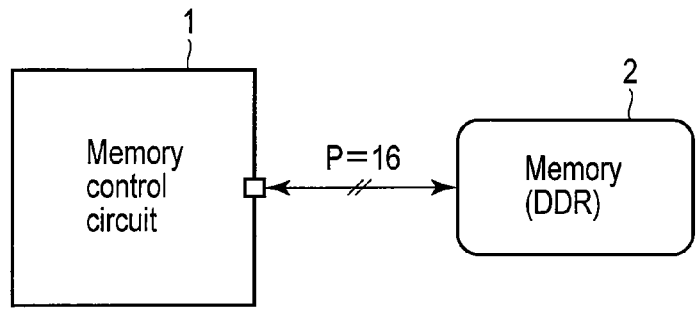
F I G. 10
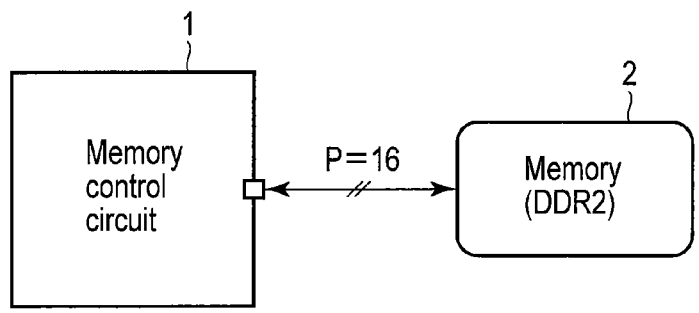
F I G. 11
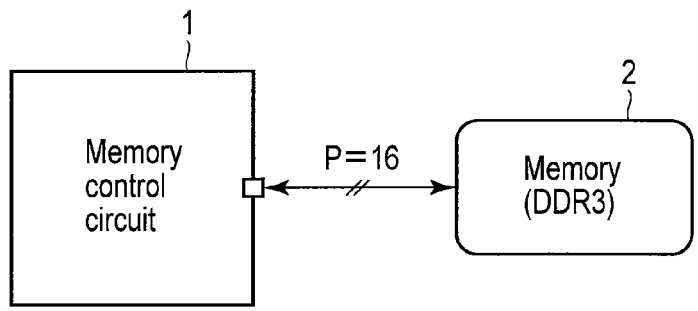
F I G. 12
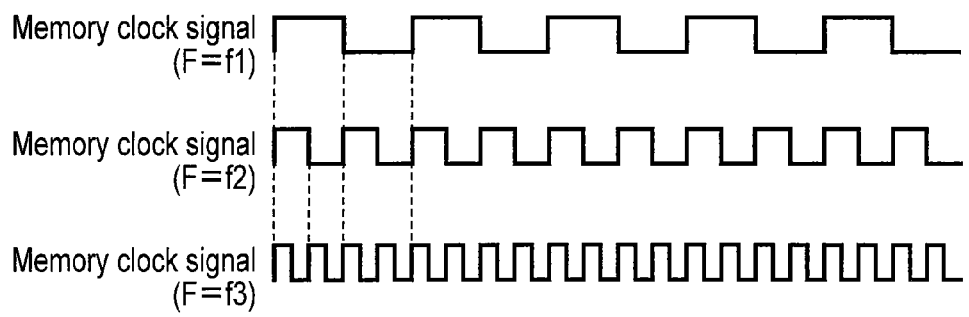
F I G. 13

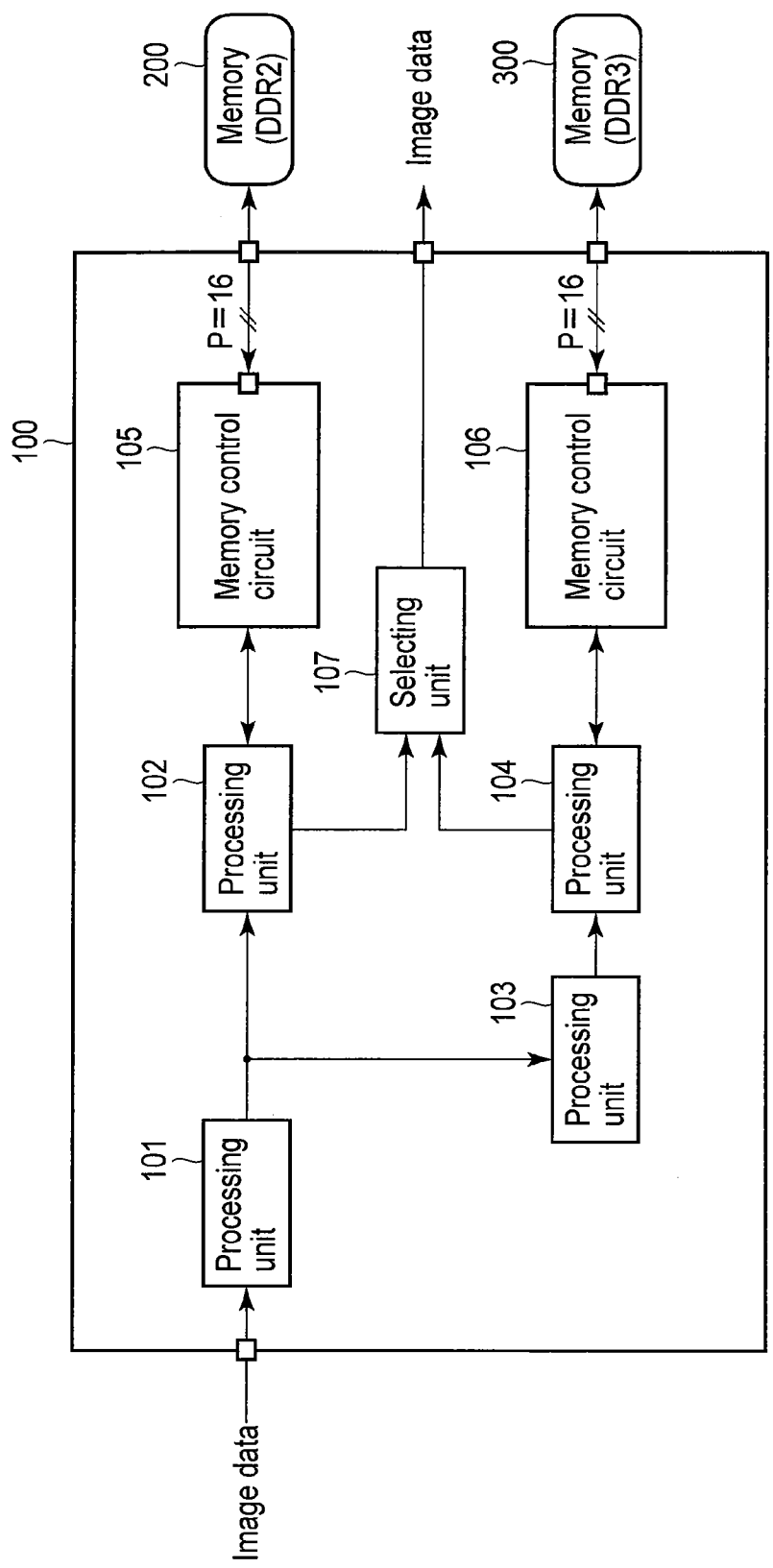
F I G. 14

MEMORY CONTROL CIRCUIT, CONTROL METHOD THEREFOR, AND IMAGE PROCESSING APPARATUS

CROSS-REFERENCE TO RELATED APPLICATIONS

This application is based upon and claims the benefit of priority from U.S. provisional application 61/409,935, filed on Nov. 3, 2010, the entire contents of which are incorporated herein by reference.

FIELD

Embodiments described herein relate generally to a memory control circuit, a control method therefor, and an image processing apparatus.

BACKGROUND

An image processing apparatus such as a multi function peripheral (MFP) includes a memory control circuit in order to write data such as image data in a memory and read out the data from the memory.

In recent years, a memory control circuit having a configuration adapting to the specification of a memory in use is designed using an application-specific integrated circuit (ASIC).

If the memory in use is changed to a memory of a different specification, it is necessary to redesign the memory control circuit.

Under such circumstances, it is demanded that, irrespective of which of plural kinds of memories of different specifications is connected, the memories can be properly controlled.

BRIEF DESCRIPTION OF THE DRAWINGS

FIG. 3 is a diagram for explaining a flow of a read operation from the memory;

FIG. 8 is a time chart of the operation of the memory control circuit;

FIG. 10 is a diagram of an example of a connection form of the memory to the memory control circuit;

FIG. 11 is a diagram of an example of a connection form of the memory to the memory control circuit;

FIG. 12 is a diagram of an example of a connection form of the memory to the memory control circuit;

FIG. 13 is a diagram of a state of a frequency change of a memory clock signal; and FIG. 14 is a block diagram of a part of an image processing apparatus.

DETAILED DESCRIPTION

In general, according to one embodiment, a memory control circuit includes an input buffer, an output buffer, a counter, an issuing unit, a first controller, a register, and a second controller. The input buffer has a variable storage capacity and captures and stores data in synchronization with a first clock signal. The output buffer has the variable storage capacity and outputs stored data in synchronization with the first clock signal. The counter cyclically counts from a first value to a second value on the basis of the first clock signal. The issuing unit issues a write command if a count value of the counter is a third value and issues a read command if the count value is a fourth value. The first controller writes, according to the issuance of the write command, the data stored in the input buffer in a memory in synchronization with a second clock signal and reads out, according to the issuance of the read command, an amount of data storable by the output buffer from the memory in synchronization with the second clock signal and writes the data in the output buffer. The register stores a first setting value concerning the storage capacity, a second setting value concerning the second value, and a third setting value concerning one of the third and fourth values to be capable of changing each of the setting values. The second controller controls the input buffer, the output buffer, the counter, and the issuing unit to set the storage capacity, the second value, and one of the third and fourth values respectively to values corresponding to the first to third setting values.

An embodiment is explained below with reference to the drawings.

Figure 1:
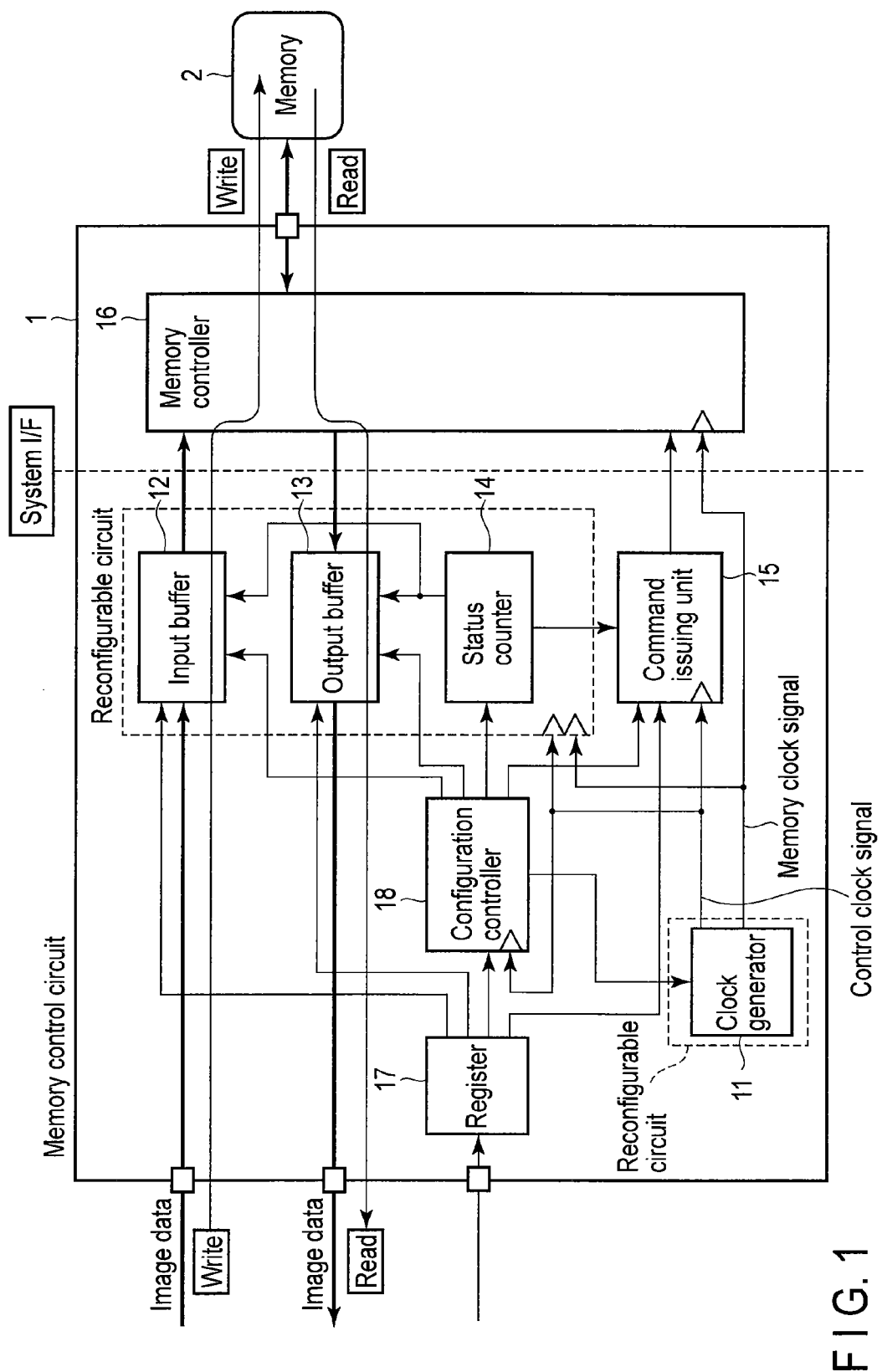
FIG. 1 is a block diagram of a memory control circuit according to an embodiment.

FIG. 1 is a block diagram of a memory control circuit 1 according to this embodiment.

The memory control circuit 1 includes a clock generator 11, an input buffer 12, an output buffer 13, a status counter 14, a command issuing unit 15, a memory controller 16, a register 17, and a configuration controller 18.

The clock generator 11 generates and outputs a control clock signal and a memory clock signal. Frequencies of the control clock signal and the memory clock signal are different from each other and may be either synchronized or not. The clock generator 11 is configured on, for example, a reconfigurable circuit. The reconfigurable circuit may be a reconfigurable circuit having a well-known structure.

The input buffer 12 captures and stores, in synchronization with the control clock signal, image data input from the outside of the memory control circuit 1. The memory controller 16 reads out the image data stored by the input buffer 12. The input buffer 12 is configured on, for example, a reconfigurable circuit. The reconfigurable circuit may be a reconfigurable circuit having a well-known structure.

The output buffer 13 stores the image data written by the memory controller 16. The output buffer 13 outputs the stored image data in synchronization with the control clock signal. The output buffer 13 is configured on, for example, a reconfigurable circuit. The reconfigurable circuit may be a reconfigurable circuit having a well-known structure.

When the memory control circuit 1 is mounted on an image processing apparatus such as an MFP, for example, image data subjected to some data processing by an image processing unit is input to the input buffer 12. For example, the image data output by the output buffer 13 is given to an image processing unit configured to apply some data processing to the image data.

The status counter 14 cyclically counts from a first value to a second value on the basis of the control clock signal. The status counter 14 is configured on, for example, a reconfigurable circuit. The reconfigurable circuit may be a reconfigurable circuit having a well-known structure.

The command issuing unit 15 issues a write command if a count value of the status counter 14 is a third value and issues a read command if the count value is a fourth value.

The memory controller 16 writes, according to the issuance of the write command by the command issuing unit 15, data stored by the input buffer 12 in the memory 2 in synchronization with the memory clock signal. The memory controller 16 reads out, according to the issuance of the read command by the command issuing unit 15, an amount of data storable by the output buffer 13 from the memory 2 in synchronization with the memory clock signal and writes the data in the output buffer 13. In other words, the memory controller 16 includes a function of a first controller.

The register 17 stores a first setting value concerning a storage capacity of the input buffer 12 and the output buffer 13, second to fourth setting values concerning the second to fourth values, and a fifth setting value concerning a frequency of the control clock signal. The register 17 can individually change the setting values according to a request from the outside.

The configuration controller 18 configures the input buffer 12, the output buffer 13, the status counter 14, and the clock generator 11 on a reconfigurable circuit to set the storage capacity of the input buffer 12 and the output buffer 13, the second value, and the frequency of the control clock signal to values corresponding to the first, second, and fifth setting values stored by the register 17. The configuration controller 18 controls the command issuing unit 15 to set the third and fourth values to values corresponding to the third and fourth setting values stored by the register 17. In other words, the configuration controller 18 controls the clock generator 11, the input buffer 12, the output buffer 13, the counter 14, and the issuing unit 15 according to the setting values stored by the register 17. Consequently, the configuration controller 18 includes a function of a second controller.

The operation of the memory control circuit 1 configured as explained above is explained.

Figure 2:
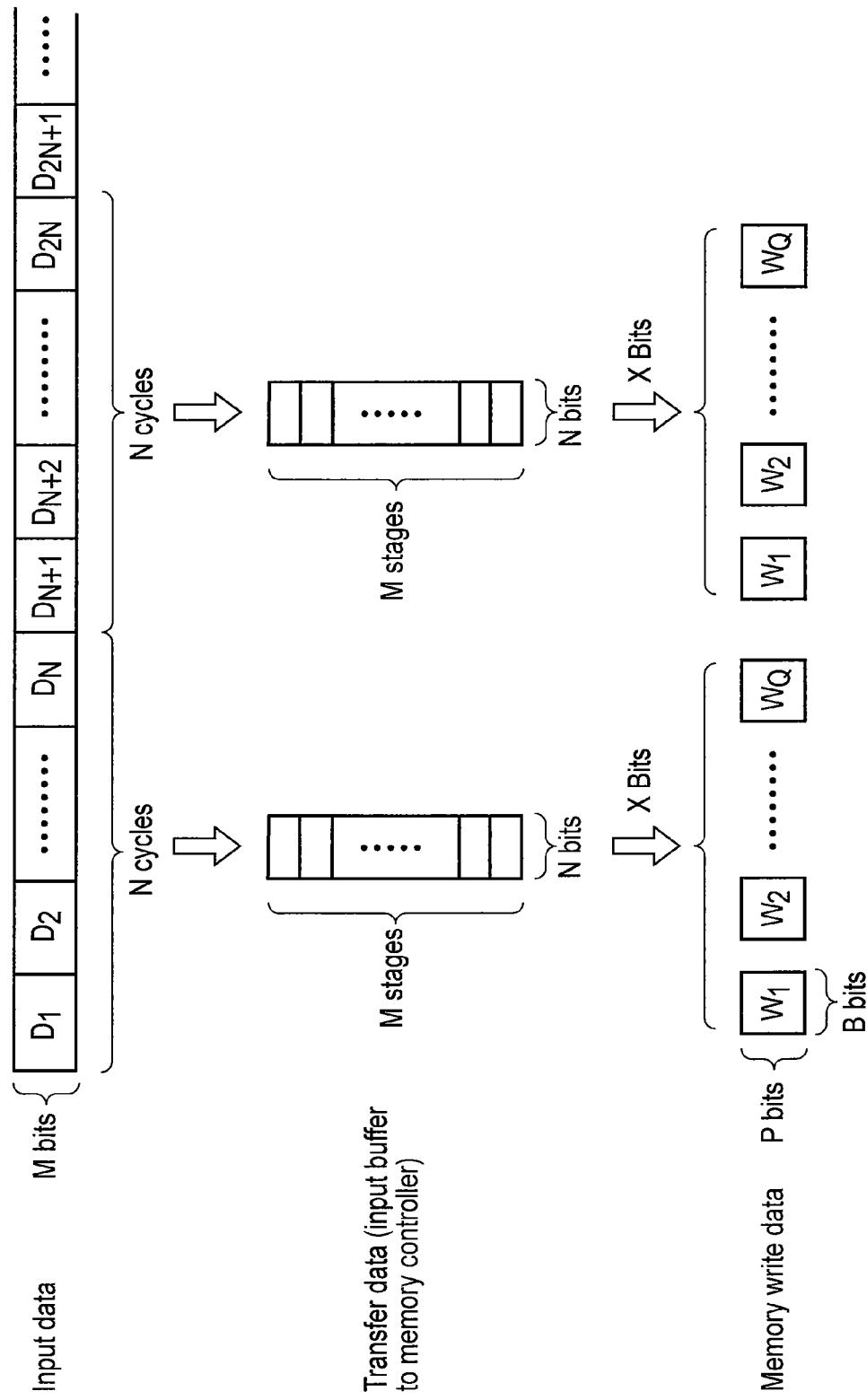
FIG. 2 is a diagram for explaining a flow of a write operation in a memory.

FIG. 2 is a diagram for explaining a flow of a write operation in the memory 2.

Image data is input to the input buffer 12 as parallel data having M-bit width represented as input data in FIG. 2.

The input buffer 12 stores input data for N cycles as data having a size of N bits×M stages. The memory controller 16 collectively reads out data for N×M=X bits stored by the input buffer 12 from the input buffer 12.

The memory controller 16 divides the X-bit data into Q memory write data for each P bits×B bits and writes each of the memory write data in the memory 2. P and B represent data width and burst length of the memory 2. Qth memory write data could be smaller than P bits×B bits.

FIG. 3 is a diagram for explaining a flow of a read operation from the memory 2.

The memory controller 16 reads out, as memory read data for P bits×B bits, the image data stored in the memory 2. The memory controller 16 obtains Q memory read data to have a total data amount of X bits and writes the data for X bits in the output buffer 13 as data having a size of N bits×M stages.

The output buffer 13 outputs, as parallel data having M bit width represented as output data in FIG. 3, the data written by the memory controller 16.

More detailed operations are explained below.

Figure 4:
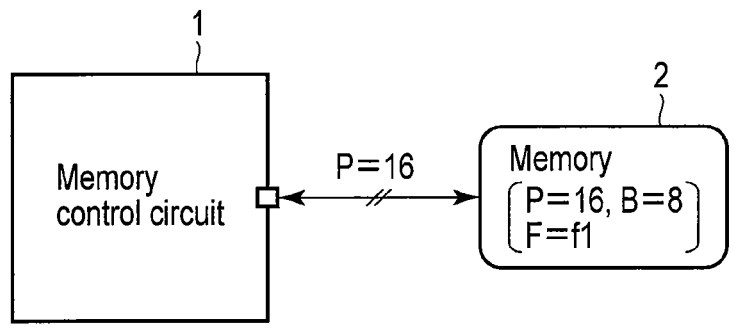
FIG. 4 is a diagram of an example of a connection form of the memory to the memory control circuit.

First, as shown in FIG. 4, it is assumed that the memory 2 of a first specification in which the data width P is 16 bits, the burst length B is 8 bits, and a frequency F of the memory clock signal is f1 is connected to the memory control circuit 1.

In this case, for example, "32", "31", "2", "18", and "f1" are written in the register 17 respectively as the first to fifth setting values. According to the setting values, the configuration controller 18 configures the clock generator 11 to generate the memory clock signal having the frequency f1. The configuration controller 18 configures the input buffer 12 and the output buffer 13 to be capable of storing image data for 32 bits×M stages. The configuration controller 18 configures the status counter 14 to cyclically count from a first value=0 to a second value=31. The configuration controller 18 sets "2" and "18" in the command issuing unit 15 as third and fourth values.

Figure 5:
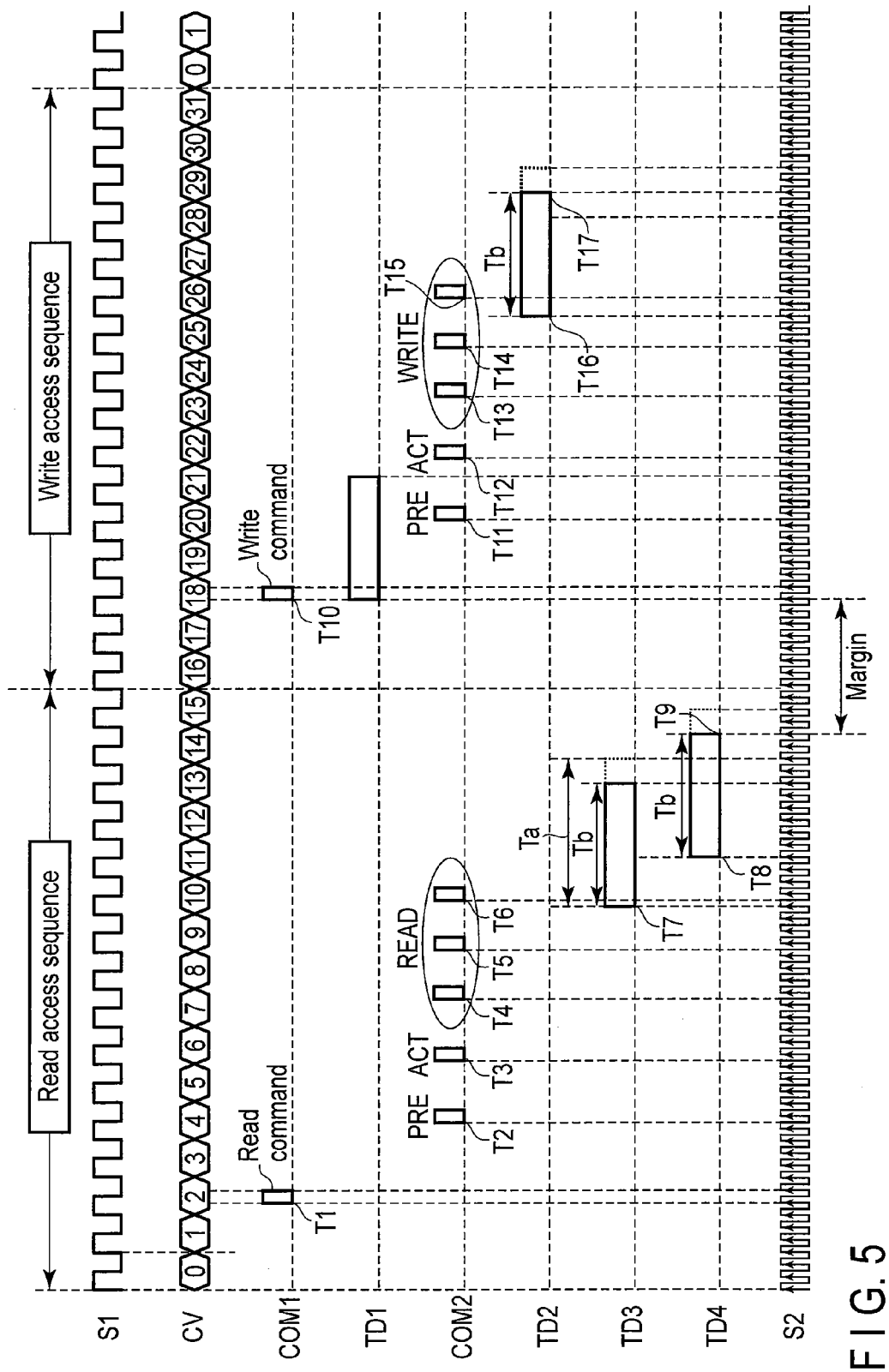
FIG. 5 is a time chart of the operation of the memory control circuit.

FIG. 5 is a time chart of the operation of the memory control circuit 1.

In FIG. 5, S1 represents the control clock signal, CV represents a count value of the status counter 14, COM1 represents a command issued to the memory controller 16 by the command issue unit 15, TD1 represents transfer data from the input buffer 12 to the memory controller 16, COM2 represents a command given from the memory controller 16 to the memory 2, TD2 represents transfer data from the memory controller 16 to the memory 2, TD3 represents transfer data from the memory 2 to the memory controller 16, TD4 represents transfer data from the memory controller 16 to the output buffer 13, and S2 represents the memory clock signal.

The status counter 14 cyclically counts from 0 to 31 on the basis of the control clock signal. In other words, the status counter 14 cyclically counts a period equivalent to 32 cycles. Since a storage capacity of the input buffer 12 is 32 bits×M stages, the input buffer 12 can store image data input in the period in which the status counter 14 counts from "0" to "31". Since a storage capacity of the output buffer 13 is 32 bits×M stages, the output buffer 13 outputs, in the period in which the status counter 14 counts from "0" to "31", image data stored when a count value of the status counter 14 returns to "0".

At timing T1 when the memory clock signal rises when the count value is "2", the command issuing unit 15 issues a read command.

If the memory controller 16 receives the read command, at timing T2 when a short time elapses after the read command is received, the memory controller 16 sends a precharge command to the memory 2. At timing T3 when a short time further elapses, the memory controller 16 sends an act command to the memory 2. Thereafter, the memory controller 16 sends the read command to the memory 2 Q times at a fixed time interval.

Data width M of the image data is, for example, 10 bits. If M is 10, X is 32×10=320 bits. Since the data width P is 16 bits and the burst length B is 8 bits, the memory write data and the memory read data have a size of 16×8=128 bits. Since 320/128=2.5, the memory controller 16 determines Q=3. Such a situation is shown in FIG. 5. The memory controller 16 outputs the read command at each of timings T4, T5, and T6. The interval of the read command is time required for transferring one memory read data from the memory 2 to the memory controller 16.

If the memory 2 receives the read command, at timing when a short time elapses after the read command is received, the memory 2 starts output of the memory read data. Specifically, the output of the memory read data is started at timing T7 when a short time elapses from timing T4. Since the interval of the read command is the time required for transferring one memory read data from the memory 2 to the memory controller 16, three memory read data, i.e., the image data for X bits is continuously transferred from the memory 2 to the memory controller 16 as shown in FIG. 5.

The image data read out from the memory 2 by the memory controller 16 in this way starts to be written in the output buffer 13 at timing T8 when a short time elapses from timing T7.

Since the size of one memory read data is 128 bits, three memory read data has a size of 384 bits. Time required for transferring the three memory read data is time Ta shown in FIG. 5. However, since X is 320 bits, actual time required for the transfer of the image data is time Tb shown in FIG. 5. Therefore, at timing T9 when the time Tb elapses from timing T8, writing of the image data for X bits in the output buffer 13 is completed.

At timing T10 when the memory clock signal rises when the count value is "18", the command issuing unit 15 issues a write command.

If the memory controller 16 receives the write command, the memory controller 16 starts readout of the 320-bits image data stored in the input buffer 12. Further, at timing T11 when a short time elapses after the write command is received, the memory controller 16 sends a precharge command to the memory 2. At timing T12 when a short time further elapses, the memory controller 16 sends an act command to the memory 2. Thereafter, the memory controller 16 sends the write command to the memory 2 at timings T13, T14, and T15 at a fixed time interval. The interval of the write command is time required for transferring one memory write data from the memory controller 16 to the memory 2.

At timing T16 when a short time elapses after the first write command is sent, the memory controller 16 starts output of first memory write data. Since the interval of write commands is the time required for transferring one memory write data from the memory controller 16 to the memory 2, the three memory write data, i.e., the image data for X bits is continuously written from the memory controller 16 in the memory 2 as shown in FIG. 5. At timing T17 when the time Tb elapses from timing T16, the writing of the image data for X bits in the memory 2 is completed.

In the operation explained above, there is a margin between timing T9 when the writing of the image data for X bits in the output buffer 13 is completed and timing T10 when the readout from the input buffer 12 is started. The read operation and the write operation do not interfere with each other.

Figure 6:
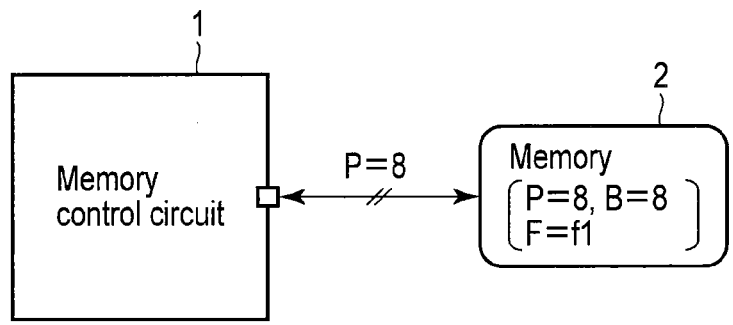
FIG. 6 is a diagram of an example of a connection form of the memory to the memory control circuit.

As shown in FIG. 6, is it assumed that the memory 2 of a second specification in which the data width P is 8 bits, the burst length B is 8 bits, and the frequency F of the memory clock signal is f1 is connected to the memory control circuit 1.

Figure 7:
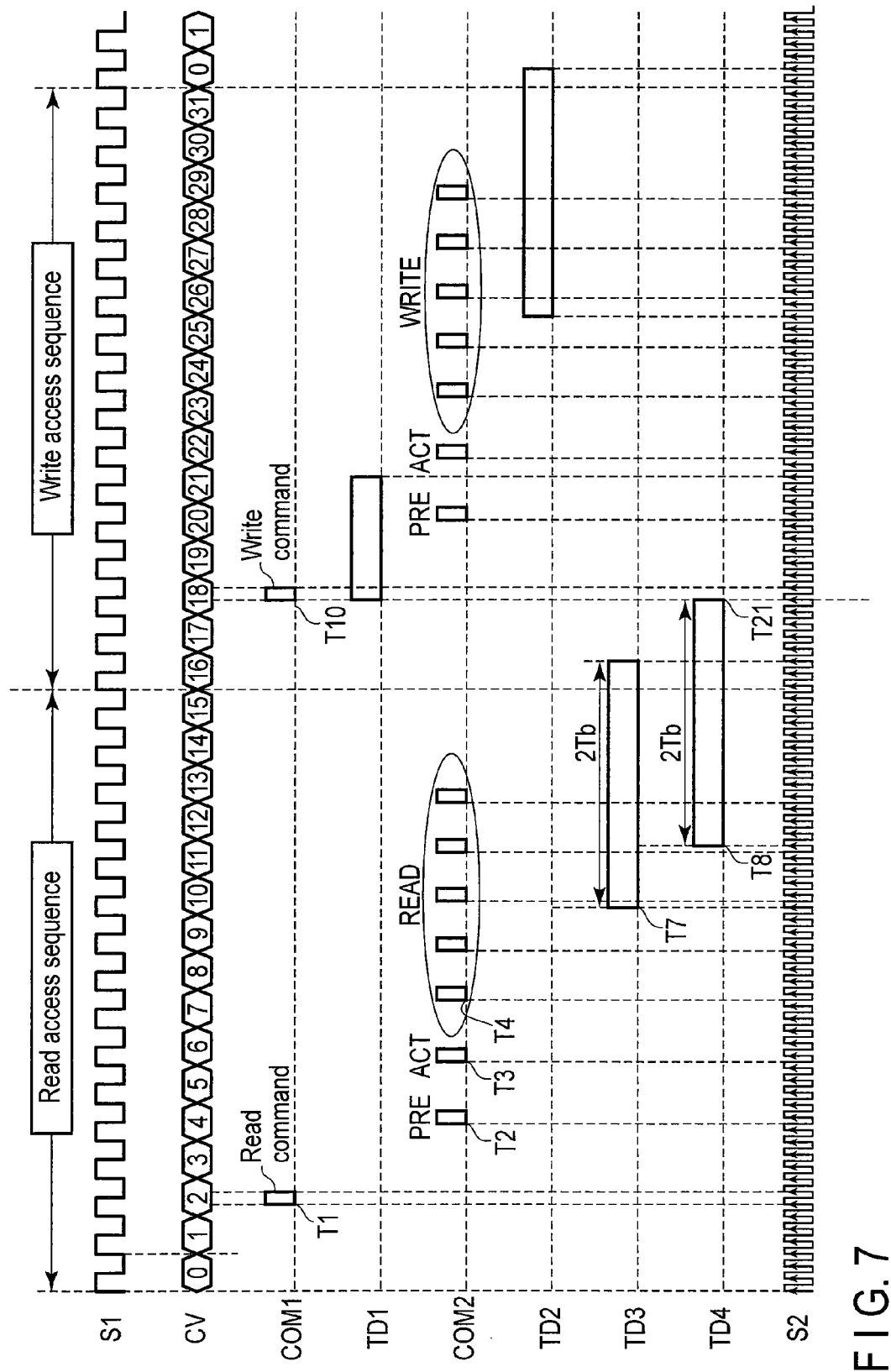
FIG. 7 is a time chart of the operation of the memory control circuit.

In this case, the memory write data and the memory read data have a size of 8×8=64 bits. If N is kept as "32", since 320/64=5, the memory controller 16 determines Q=5. If the memory control circuit 1 operates as explained above, time required for the transfer of the 320-bit image data is twice as long as the time Tb. Therefore, as shown in FIG. 7, a writing period of the image data in the output buffer 13 and a readout period of the image data from the input buffer 12 overlap. The read operation and the write operation interfere with each other.

Therefore, in a situation shown in FIG. 6, for example, "64", "63", "2", "34", and "f1" are written in the register 17 respectively as the first to fifth setting values. According to the setting values, the configuration controller 18 configures the clock generator 11 to generate the memory clock signal having the frequency f1. The configuration controller 18 configures the input buffer 12 and the output buffer 13 to be capable of storing image data for 64 bits×M stages. The configuration controller 18 configures the status counter 14 to cyclically count from a first value=0 to a second value=63. The configuration controller 18 sets "2" and "34" in the command issuing unit 15 as third and fourth values.

FIG. 8 is a time chart of the operation of the memory control circuit 1. In FIG. 8, only a read access sequence is shown and a write access sequence is not shown.

The status counter 14 cyclically counts from 0 to 63 on the basis of the control clock signal. In other words, the status counter 14 cyclically counts a period equivalent to 64 cycles. Since a storage capacity of the input buffer 12 is 64 bits×M stages, the input buffer 12 can store image data input in the period in which the status counter 14 counts from "0" to "63". Since a storage capacity of the output buffer 13 is 64 bits×M stages, the output buffer 13 outputs, in the period in which the status counter 14 counts from "0" to "63", image data stored when a count value of the status counter 14 returns to "0".

At timing T31 when the memory clock signal rises when the count value is "2", the command issuing unit 15 issues a read command.

If the memory controller 16 receives the read command, at timing T32 when a short time elapses after the read command is received, the memory controller 16 sends a precharge command to the memory 2. At timing T33 when a short time further elapses, the memory controller 16 sends an act command to the memory 2. Thereafter, the memory controller 16 sends the read command to the memory 2 Q times at a fixed time interval.

X is 64×10=640 bits. Since the data width P is 8 bits and the burst length B is 8 bits, the memory write data and the memory read data have a size of 8×8=64 bits. Since 640/64=10, the memory controller 16 determines Q=10. Such a situation is shown in FIG. 8. The memory controller 16 outputs the read command at each of timings T34 to T43. The interval of the read command is time required for transferring one memory read data from the memory 2 to the memory controller 16.

If the memory 2 receives the read command, at timing when a short time elapses after the read command is received, the memory 2 starts output of the memory read data. Specifically, the output of the memory read data is started at timing T44 when a short time elapses from timing T34. Since the interval of the read command is the time required for transferring one memory read data from the memory 2 to the memory controller 16, ten memory read data, i.e., the image data for X bits is continuously transferred from the memory 2 to the memory controller 16 as shown in FIG. 8.

The image data read out from the memory 2 by the memory controller 16 in this way starts to be written in the output buffer 13 at timing T45 when a short time elapses from timing T44. The data width P is a half and X is two times as large as those in the example shown in FIG. 5. Therefore, time required for transfer of the 640-bit image data is four times as long as the time Tb. Therefore, at timing T46 when time 4Tb elapses from timing T45, the writing of the image data for X bits in the buffer 13 is completed.

In this way, the time required for writing of the image data in the output buffer 13 is longer than that in the example shown in FIG. 5. However, the command issuing unit 15 issues the write command at timing T47 when the memory clock signal rises when the count value is "34".

In the operation explained above, there is a sufficient margin between timing T46 when the writing of the image data for X bits in the output buffer 13 is completed and timing T47 when the readout from the input buffer 12 is started. The read operation and the write operation do not interfere with each other.

Consequently, with the memory control circuit 1, the various setting values stored by the register 17 can be changed as appropriate, the storage capacity of the input buffer 12 and the output buffer 13, the count range of the status counter 14, and the timing when the command issuing unit 15 issues the read command and the write command can be arbitrarily changed according to the setting values. Therefore, it is possible to perform an operation adapting to the specification of the memory 2 connected to the memory control circuit 1.

Figure 9:
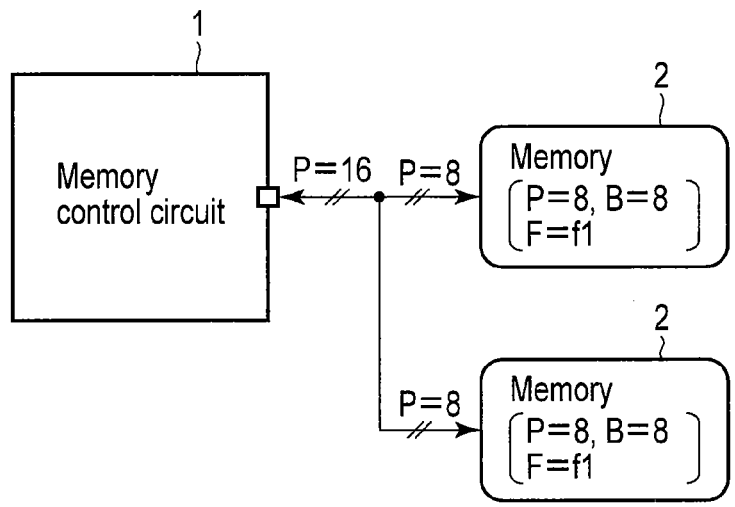
FIG. 9 is a diagram of an example of a connection form of the memory to the memory control circuit.

Not only in the form shown in FIGS. 4 and 6 but also in a form in which, for example, two memories 2 of the second specification are connected in parallel as shown in FIG. 9, the memory control circuit 1 can perform an operation adapting to the form.

The memory control circuit 1 can change the frequency F of the memory clock signal generated by the clock generator 11. Consequently, for example, as shown in FIGS. 10 to 12, irrespective of which of the memories 2 of the first to third specifications having different operation clocks is connected, it is possible to perform an operation adapting to each of the specifications.

In FIGS. 10 to 12, examples in which the memory 2 is a memory of a double-data-rate (DDR) standard, a memory of a DDR2 standard, and a memory of a DDR3 standard are respectively shown.

In this case, in each of the forms shown in FIGS. 10 to 12, the frequency F is changed to f1, f2, and f3 and the memory clock signal is changed, for example, as shown in FIG. 13.

If plural memory control circuits 1 are included in the image processing apparatus, it is possible to mix and use plural memories of different specifications.

FIG. 14 is a block diagram of a part of an image processing apparatus 100.

The image processing apparatus 100 includes processing units 101, 102, 103, and 104, memory control circuits 105 and 106, and a selecting unit 107.

The processing unit 101 applies data processing to image data.

The processing unit 102 further applies different data processing to image data obtained by the processing unit 101. The processing unit 102 applies data processing to image data output by the memory control circuit 105.

The processing unit 103 further applies different data processing to the image data obtained by the processing unit 101.

The processing unit 104 further applies different data processing to image data obtained by the processing unit 103. The processing unit 104 applies data processing to image data output by the memory control circuit 106.

The memory control circuit 105 includes a configuration same as that of the memory control circuit 1 explained above. The memory control circuit 105 writes image data obtained by the processing unit 102 in a memory 200. The memory control circuit 105 reads out the image data stored in the memory 200 from the memory 200 and gives the image data to the processing unit 102.

The memory control circuit 106 includes a configuration same as that of the memory control circuit 1 explained above. The memory control circuit 106 writes image data obtained by the processing unit 104 in a memory 300. The memory control circuit 106 reads out the image data stored in the memory 300 and gives the image data to the processing unit 104.

The selecting unit 107 selects one of the image data respectively obtained by the processing units 102 and 104 and outputs the image data.

As explained above, the memory control circuits 105 and 106 can perform the operations adapting to the memories of the different specifications. Therefore, whereas the memory of the DDR2 standard is used as the memory 200, the memory of the DDR3 standard is used as the memory 300.

Since the image processing apparatus 100 is configured as explained above, in addition and replacement of a memory, it is possible to adopt memory of a new specification and an easily-available memory as appropriate.

This embodiment can be variously modified as explained below.

The command issuing unit 15 may be configured on a reconfigurable circuit. A part or all of the clock generator 11, the input buffer 12, the output buffer 13, and the status counter 14 may be configured without using a reconfigurable circuit.

Plural candidate values of the setting values may be stored in the register 17 and one of the candidate values may be used as the setting value.

Sets of setting values concerning each of memories of plural specifications may be stored in the register 17 and a setting value of a set corresponding to a memory in use may be used.

A minimum value of a count value of the status counter 14 is set to "0". However, the minimum value can be changed to another arbitrary value. A setting value concerning the minimum value may be stored in the register 17 and the minimum value may be changed according to the setting value.

When data other than image data is written in a memory or read out from the memory, the embodiment can be directly applied.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory control circuit comprising:
    an input buffer having a variable storage capacity and configured to capture and store data in synchronization with a first clock signal;
    an output buffer having the variable storage capacity and configured to output stored data in synchronization with the first clock signal;
    a counter configured to cyclically count from a first value to a second value on the basis of the first clock signal;
    an issuing unit configured to issue a write command if a count value of the counter is a third value and issue a read command if the count value is a fourth value;
    a first controller configured to write, according to the issuance of the write command, the data stored in the input buffer in a memory in synchronization with a second clock signal and read out, according to the issuance of the read command, an amount of data storable by the output buffer from the memory in synchronization with the second clock signal and write the read out data in the output buffer;
    a register configured to store a first setting value concerning the storage capacity, a second setting value concerning the second value, and a third setting value concerning one of the third and fourth values to be capable of changing each of the setting values; and
    a second controller configured to control the input buffer, the output buffer, the counter, and the issuing unit to set the storage capacity, the second value, and one of the third and fourth values respectively to values corresponding to the first, second and third setting values.

2. The circuit of claim 1, further comprising a reconfigurable circuit, wherein
the second controller configures, on the reconfigurable circuit, the input buffer and the output buffer having a storage capacity corresponding to the first setting value.

3. The circuit of claim 1, further comprising a reconfigurable circuit, wherein
the second controller configures, on the reconfigurable circuit, the counter configured to cyclically count from the first value to the second value corresponding to the second setting value on the basis of the first clock signal.

4. The circuit of claim 1, further comprising a reconfigurable circuit, wherein
the second controller configures, on the reconfigurable circuit, the issuing unit configured to issue the write command if the count value of the counter is the third value corresponding to the third setting value and issue the read command if the count value is the fourth value.

5. The circuit of claim 1, wherein
the register further stores, separately from the third setting value concerning one of the third and fourth values, a fourth setting value concerning the other of the third and fourth values to be capable of changing the fourth setting value, and
the second controller controls the issuing unit to set one of the third and fourth values to a value corresponding to the third setting value and set the other of the third and fourth values to a value corresponding to the fourth setting value.

6. The circuit of claim 5, further comprising a reconfigurable circuit, wherein
the second controller configures, on the reconfigurable circuit, the issuing unit configured to issue the write command if the count value of the counter is the third value corresponding to the third setting value and issue the read command if the count value is the fourth value corresponding to the fourth setting value.

7. The circuit of claim 1, further comprising a generator configured to generate the second clock signal and capable of changing a frequency of the second clock signal, wherein
the register further stores a fifth setting value concerning the frequency to be capable of changing the fifth setting value, and
the second controller controls the generator to set the frequency to a value corresponding to the fifth setting value.

8. The circuit of claim 7, further comprising a reconfigurable circuit, wherein
the second controller configures, on the reconfigurable circuit, the generator configured to generate the second clock signal having the frequency corresponding to the fifth setting value.

9. The circuit of claim 1, further comprising the memory.

10. An image processing apparatus comprising:
a first processor configured to process image data;
an input buffer having a variable storage capacity and configured to capture and store the image data processed by the first processor in synchronization with a first clock signal;
an output buffer having the variable storage capacity and configured to output stored image data in synchronization with the first clock signal;
a second processor configured to process the image data output by the output buffer;
a counter configured to cyclically count from a first value to a second value on the basis of the first clock signal;
an issuing unit configured to issue a write command if a count value of the counter is a third value and issue a read command if the count value is a fourth value;
a first controller configured to write, according to the issuance of the write command, the image data stored in the input buffer in a memory in synchronization with a second clock signal and read out, according to the issuance of the read command, an amount of image data storable by the output buffer from the memory in synchronization with the second clock signal and write the read out image data in the output buffer;
a register configured to store a first setting value concerning the storage capacity, a second setting value concerning the second value, and a third setting value concerning one of the third and fourth values to be capable of changing each of the setting values; and
a second controller configured to control the input buffer, the output buffer, the counter, and the issuing unit to set the storage capacity, the second value, and one of the third and fourth values respectively to values corresponding to the first, second and third setting values.

11. The apparatus of claim 10, further comprising a reconfigurable circuit, wherein
the second controller configures, on the reconfigurable circuit, the input buffer and the output buffer having a storage capacity corresponding to the first setting value.

12. The apparatus of claim 10, further comprising a reconfigurable circuit, wherein
the second controller configures, on the reconfigurable circuit, the counter configured to cyclically count from the first value to the second value corresponding to the second setting value on the basis of the first clock signal.

13. The apparatus of claim 10, further comprising a reconfigurable circuit, wherein
the second controller configures, on the reconfigurable circuit, the issuing unit configured to issue the write command if the count value of the counter is the third value corresponding to the third setting value and issue the read command if the count value is the fourth value.

14. The apparatus of claim 10, wherein
the register further stores, separately from the third setting value concerning one of the third and fourth values, a fourth setting value concerning the other of the third and fourth values to be capable of changing the fourth setting value, and
the second controller controls the issuing unit to set one of the third and fourth values to a value corresponding to the third setting value and set the other of the third and fourth values to a value corresponding to the fourth setting value.

15. The apparatus of claim 14, further comprising a reconfigurable circuit, wherein
the second controller configures, on the reconfigurable circuit, the issuing unit configured to issue the write command if the count value of the counter is the third value corresponding to the third setting value and issue the read command if the count value is the fourth value corresponding to the fourth setting value.

16. The apparatus of claim 10, further comprising a generator configured to generate the second clock signal and capable of changing a frequency of the second clock signal, wherein
the register further stores a fifth setting value concerning the frequency to be capable of changing the fifth setting value, and the second controller controls the generator to set the frequency to a value corresponding to the fifth setting value.

17. The apparatus of claim 16, further comprising a reconfigurable circuit, wherein
the second controller configures, on the reconfigurable circuit, the generator configured to generate the second clock signal having the frequency corresponding to the fifth setting value.

18. The apparatus of claim 10, further comprising the memory.

19. A control method for a memory control circuit including:
an input buffer having a variable storage capacity and configured to capture and store data in synchronization with a first clock signal;
an output buffer having the variable storage capacity and configured to output stored data in synchronization with the first clock signal;
a counter configured to cyclically count from a first value to a second value on the basis of the first clock signal;
an issuing unit configured to issue a write command if a count value of the counter is a third value and issue a read command if the count value is a fourth value;
a first controller configured to write, according to the issuance of the write command, the data stored in the input buffer in a memory in synchronization with a second clock signal and read out, according to the issuance of the read command, an amount of data storable by the output buffer from the memory in synchronization with the second clock signal and write the read out data in the output buffer;
a register configured to store a first setting value concerning the storage capacity, a second setting value concerning the second value, and a third setting value concerning one of the third and fourth values to be capable of changing each of the setting values; and
a second controller,
the control method comprising allowing the second controller control the input buffer, the output buffer, the counter, and the issuing unit to set the storage capacity, the second value, and one of the third and fourth values respectively to values corresponding, second and the first to third setting values.

* * * * *